United States Patent [19]
Ishikawa et al.

[11] 3,753,125
[45] Aug. 14, 1973

[54] FREQUENCY MULTIPLIER CIRCUIT

[75] Inventors: Masashi Ishikawa; Kunihiko Ota, both of Tokyo, Japan

[73] Assignee: Nippon Electric Company Limited, both of Tokyo, Japan

[22] Filed: July 27, 1972

[21] Appl. No.: 275,668

[30] Foreign Application Priority Data
July 27, 1971 Japan..........................46/56613

[52] U.S. Cl......................... 328/38, 328/37, 328/48
[51] Int. Cl. .............................................. H03k 5/13
[58] Field of Search........................ 328/160, 48, 37, 328/38

[56] References Cited
UNITED STATES PATENTS

| | | | |
|---|---|---|---|
| 3,551,826 | 12/1970 | Sepe .................................. | 328/160 |
| 3,581,116 | 5/1971 | Leostic ............................. | 328/48 X |
| 3,605,026 | 9/1971 | Bowden ............................ | 328/37 X |
| 3,660,842 | 5/1972 | Ballantyne ....................... | 328/48 X |
| 3,673,391 | 6/1972 | Lougheed ......................... | 328/38 X |

*Primary Examiner*—John S. Heyman
*Attorney*—Richard C. Sughrue, Darryl Mexic and J. Frank Osha et al.

[57] ABSTRACT

Apparatus for multiplying an input frequency by a number A/B where A and B are integers and $A > B$. During one period of the input frequency, $f_{in}$, pulses at a rate $fo/A$ are accumulated and held. Pulses at a rate $fo/B$ are continuously counted and for each P pulses of said latter pulses an output pulse is generated. Since P is the number of $fo/A$ rate pulses occurring during one period of $f_{in}$, the output pulse rate is $f_{in} \times A/B$. Additional means are provided for averaging the period of $f_{in}$ by counting the $fo/A$ rate pulses for a multiple of periods of $f_{in}$ and obtaining the number P occurring during a single period by effectively dividing the accumulated pulses by said multiple.

6 Claims, 2 Drawing Figures

FREQUENCY MULTIPLIER CIRCUIT

BACKGROUND OF THE INVENTION

This invention relates to a frequency multiplier circuit for producing an output signal at a frequency which is not only an integral multiple but also any multiple of an input frequency.

The frequency measurement of a low-frequency signal is usually achieved by a digital counter adapted to count pulses for a long period of time, or by a time measuring unit adapted to measure one or few repetition periods of the signal and thereby to provide the measured frequency as the inverse number of one repetition period measured. Neither of these conventional approaches is free from the defect that a long time is needed to obtain the result of the measurement. With this in view, a proposal has been made that the low frequency incoming signal should be frequency-multiplied first and then subjected to the frequency measurement. This would surely help shorten the time interval needed for measuring the frequency.

In a telementary system for transmitting data by a low frequency carrier wave, the multiplication factor of the frequency multiplication is often required to be non-integral. A conventional frequency multiplier circuit, however, is not applicable to such a frequency multiplication by a non-integral factor.

SUMMARY OF THE INVENTION

It is an object of this invention, therefore, to provide a frequency multiplier circuit capable of producing an output at frequencies which are an integral or any other multiples of the input frequency.

According to this invention, there is provided a frequency multiplier circuit in which a reference signal frequency fo is converted into a pair of pulse trains at frequencies $fo/A$ and $fo/B$ (both $A$ and $B$ are integers, and $B < A$) by first and second frequency dividers, respectively; one of the pulse trains of the frequency $fo/A$ is counted for one repetition period of the input signal by a first counter, and the other of the pulse trains of the frequency $fo/B$ is counted by a second counter. The frequency-multiplied pulse of the frequency equal to the input frequency multiplied by $A/B$ is thus obtained at every time point where the output of the second counter is in coincidence with that of the first counter.

BRIEF DESCRIPTION OF THE DRAWINGS

Now, the features and advantages of this invention will be understood from the following detailed description of a preferred embodiment of this invention taken in conjunction with the accompanying drawing, wherein.

DETAILED DESCRIPTION OF THE INVENTION

Figure 1:
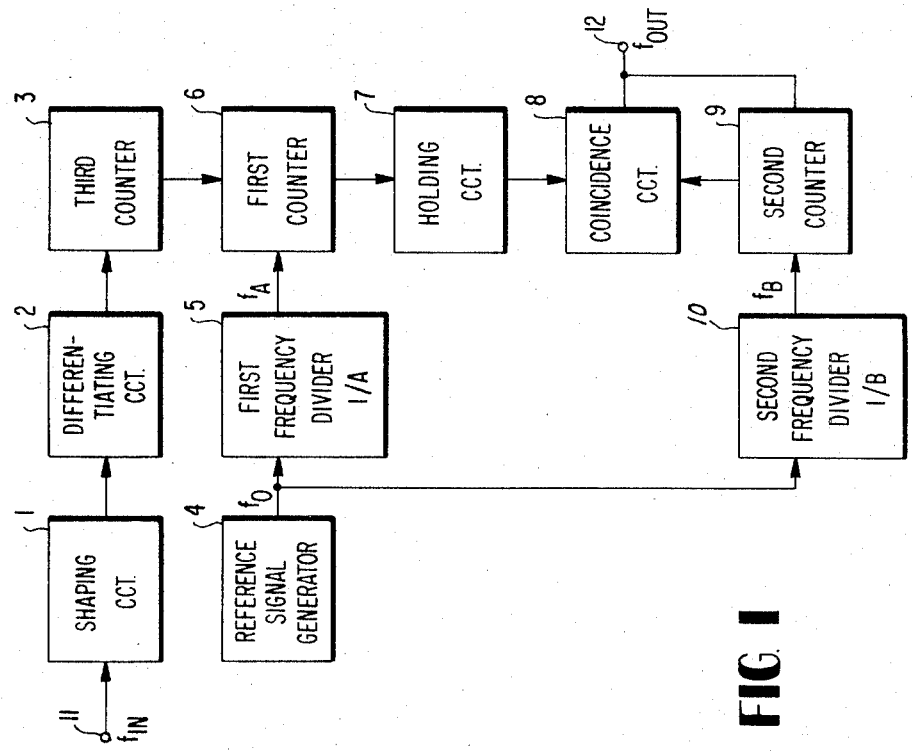
FIG. 1 is a block diagram of an embodiment of this invention.

Referring to FIG. 1, an input signal having a frequency $f_{in}$ (ranging from 20 to 40 Hz, for example) is applied to an input terminal 11. The input signal of the frequency $f_{in}$ is shaped into a square wave by a waveform shaping circuit 1 and the leading edge of the output pulse is detected by a differentiating circuit 2. The output pulses of the differentiating circuit 2 are counted by a third counter 3 for an interval of a suitable number of repetition periods corresponding to the input frequency $f_{in}$. Thus, the period of time in which each of the suitable number of repetition periods falls is averaged to provide an output signal indicating an averaged repetition period. While the measurement of the one repetition period corresponding to the input frequency $f_{in}$ can be carried out by covering only one cycle of the input signal, the averaging of a certain number of repetition periods needed in case where the input waveform has distortion. If the input signal is free from waveform distortion, the third counter 3 may be dispensed with. Upon completion of the pulse counting for the predetermined period of time to cover of the input pulse repetition periods, the third counter 3 is automatically cleared. The averaged period of the input signal of the frequency $f_{in}$ is given by the interval of two pulses respectively indicating the start of pulse counting and the clearing of the third counter 3.

On the other hand, another pulse train with a reference frequency (3MHz, for example) is supplied from a reference signal generator 4 to a first frequency divider 5, to provide a frequency-divided output of frequency $F_A$ ($f_A=fo/A$, $A=500$, for example), which is applied to a first counter 6. The first counter 6 starts counting the pulses supplied from the first frequency divider 5 on repetition of an operation-starting pulse from the third counter 3 and ceases counting in response to a pulse which designates instant of the clearing of the third counter 3. Then, the number $P$ of the pulses counted by the first counter 6 is rewritten and held at a holding circuit 7 and, at the same time, the first counter 6 is cleared.

Figure 2:
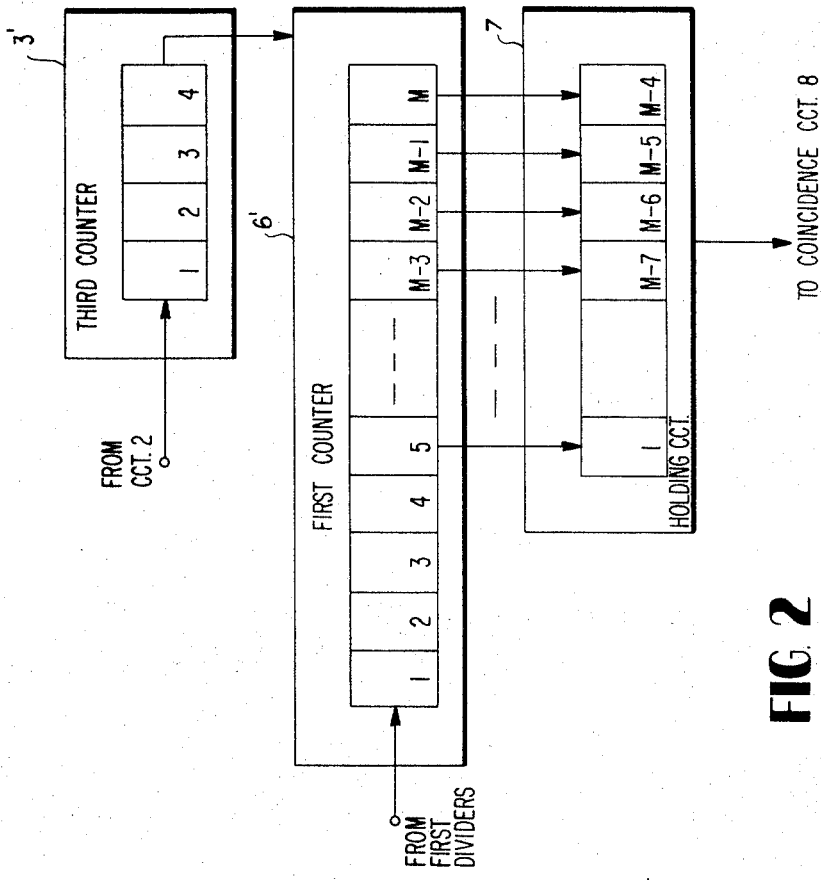
FIG. 2 is a block diagram of a modification of a part of the embodiment of this invention shown in FIG. 1.

The measurement of the period of time, in which a plurality of repetition periods of the input signal at frequency $f_{in}$ falls, to figure out the averaged one repetition period $T_{in}$ may be carried out by an arrangement shown in FIG. 2, which is a modification of the embodiment of FIG. 1. Referring to FIG. 2, the first and the third counters 7' and 3' are made of binary counter stages. These counters need not be of the binary type but must be adapted to the same number system having a base in common. The third counter 3' has the capacity for four digits and is adapted to count the pulses having the frequency $f_{in}$ supplied from the differentiating circuit 2. Thus, the counter 3' counts down the input pulse to produce an output pulse. The output pulse supplied from the divider 5 is fed into the counter 7' having M binary counter stages (M>4). The content of the counter 7' down to the (M–4) digits as counted from the most significant digit is read out every time the counter 3' delivers the output pulse, with the counter 7' being reset at the same time. The read out content of (M–4) digits is held at the holding circuit 7. Thus, the number P of pulses having frequency $f_A$ and falling in the averaged one repeition period corresponding to the input frequency $f_{in}$ is obtained at the holding circuit 7.

Although the averaging circuitry has already been described a simple example will serve to further clarify this feature. Assuming that counters 3' and 7' are binary counters, the third counter will provide output pulses which are separated by 16 periods of the input frequency. If the input frequency is $f_{in}$ and the period is $T_{in}$, consecutive output pulses will be separated by a time corresponding to 16 $T_{in}$. During this period between output pulses from counter 3', counter 7' will accumulate ( pulses at the rate of $fo/A$. Since counter 7' is also a binary counter, dropping the four low order bits is the equivalent of dividing $\zeta$ by 16. Thus the number $P$ applied to holding circuit 7 is the number of rate $fo/A$ pulses occurring during a single averaged period of $f_{in}$.

Furthermore, the pulse train of frequency fo supplied from the generator 4 is applied to a second frequency divider 10 and its frequency is converted into $f_B$ ($f_B=fo/B$, $B=3$, for example). The output of the frequency divider 10 having the frequency $fB$ is counted by a second counter 9. The outputs of the counter 9 and the holding circuit 7 are applied to a coincidence circuit 8. Every time the number of pulses counted at the second counter 9 reaches a value identical to the value held at the holding circuit 7, an output pulse is delivered to an output terminal 12 and, at the same time, the second counter 9 is cleared. In other words, the second counter 9 is cleared every time an output pulse is delivered from the coincidence circuit 8. This output pulse train has an output frequency $f_{out}$ which is equal to the input frequency $f_{in}$ multiplied by $A/B$.

Now, the period $T_{in}$ corresponding to the input pulse repetition frequency $f_{in}$ measured by the third counter 3 is expressed as:

$$T_{in} = 1/f_{in} \quad (1)$$

Likewise, the period $T_A$ corresponding to the frequency $f_A$ after the frequency division of the first frequency divider 5 is expressed as:

$$T_A = 1/f_A = A/fo \quad (2)$$

Also, the number $P$ of the pulses counted at the first counter 6 for those pulses at frequency $f_A$ for the period $T_{in}$ is expressed as:

$$P = T_{in}/T_A = (1/A) \cdot (fo/f_{in}) \quad (3)$$

The period $T_B$ of the pulses at frequency $f_B$ supplied from the second frequency divider 6 is expressed as:

$$T_B = 1/f_B = B/fo \quad (4)$$

Now, upon completion of the counting at the second counter 9 of $P$ pulses having frequency $f_B$, one pulse is delivered from the coincidence circuit 8, with the second counter 9 cleared at the same time. Therefore, the output pulse frequency $f_{out}$ is expressed as:

$$f_{out} = 1/PT_B = fo/PB \quad (5)$$

From equations (1), (2) and (5) $f_{out}$ is given by $$f_{out} = (A/B) \cdot f_{in} \quad (6)$$

Thus, the input frequency is converted into the output frequency $f_{out}$ which is equal to the input frequency $f_{in}$ multiplied by $A/B$.

What is claimed is:

1. A frequency multiplier circuit for converting the frequency of an input signal to an output frequency equal to the input frequency multiplied by $A/B$ ($A$ and $B$ are integers, $A > B$) comprising:
   means for producing a reference signal having a reference frequency $fo$;
   means for providing from said reference signal a first intermediate signal having frequency $fo/A$;
   means for providing from said reference signal a second intermediate signal having frequency $fo/B$;
   a first pulse counter for counting the pulses of said first intermediate signal for one period of said onput signal to produce an output signal representative of the number of pulses counted;
   a second pulse counter for counting the pulses of said second intermediate signal;
   means for detecting the coincidence between the outputs of said first and second pulse counters, whereby the output of said detecting means has said output frequency.

2. Apparatus for multiplying an input frequency $f_{in}$ by $A/B$ where $A > B$, comprising,
   a. means for accumulating and holding a number, $P$, representing the number of pulses of frequency $fo/A$ occurring during one period of $f_{in}$, where $fo/A > f_{in}$, and
   b. means responsive to pulses at a rate $fo/B$ and to said number, $P$, for providing an output pulse for every $P$ pulses at a rate $fo/B$.

3. Apparatus as claimed in claim 2 wherein means for accumulating and holding comprises,
   a. means for generating a frequency $fo$,
   b. divider means for dividing $fo$ by $A$ resulting in a pulse train of frequency $fo/A$,
   c. a holding circuit for holding a number applied thereto,
   d. first means for counting said pulses at frequency $fo/A$ during a period which is an integral multiple of the period of $f_{in}$, where said integral multiple may be 1, 2, 3 . . . etc., and for transferring the number counted divided by said integral multiple to said holding circuit means.

4. Apparatus as claimed in claim 3 further comprising second divider means for dividing said frequency $fo$ by $B$ to obtain a pulse train at a frequency of $fo/B$.

5. Apparatus as claimed in claim 4 wherein said means for providing output pulses comprises,
   a. second counter means for counting said pulses occurring at the rate $fo/B$,
   b. comparator means responsive to the numbers in said holding circuit means and said second counter means, respectively, for providing an output pulse when said numbers are equal, and
   c. means responsive to each said output pulse for clearing said second counter means.

6. Apparatus as claimed in claim 5 wherein said first means comprises,
   a. third counter means responsive to input frequency $f_{in}$ for providing output pulses defining the beginning and end of said period which is an integral multiple of the period of $f_{in}$, and
   b. first counter means responsive to the pulses from said third counter for counting said $fo/A$ rate pulses starting with the beginning of each said period and for transferring a portion of the count accumulated therein at the end of said period, said portion corresponding to the total number accumulated divided by $N$ where $N$ is the integral multiple of said period of $f_{in}$.

* * * * *